(12) United States Patent
Chen et al.

(10) Patent No.: US 11,546,091 B2
(45) Date of Patent: Jan. 3, 2023

(54) METHOD FOR DETERMINING HARQ-ACK CODEBOOK AND USER EQUIPMENT

(71) Applicant: VIVO MOBILE COMMUNICATION CO.,LTD., Guangdong (CN)

(72) Inventors: Xiaohang Chen, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 176 days.

(21) Appl. No.: 16/969,520

(22) PCT Filed: Feb. 2, 2019

(86) PCT No.: PCT/CN2019/074564
§ 371 (c)(1),
(2) Date: Aug. 12, 2020

(87) PCT Pub. No.: WO2019/154358
PCT Pub. Date: Aug. 15, 2019

(65) Prior Publication Data
US 2021/0021383 A1    Jan. 21, 2021

(30) Foreign Application Priority Data

Feb. 12, 2018 (CN) .......................... 201810147546.8
Feb. 14, 2018 (CN) .......................... 201810152064.1

(51) Int. Cl.
  *H04W 72/04* (2009.01)
  *H04L 1/18* (2006.01)
  *H04L 5/00* (2006.01)

(52) U.S. Cl.
  CPC .......... *H04L 1/1812* (2013.01); *H04L 5/0055* (2013.01); *H04W 72/042* (2013.01)

(58) Field of Classification Search
  CPC ... H04L 1/1812; H04L 5/0055; H04L 1/1829; H04L 1/1854; H04L 1/1861;
  (Continued)

(56) References Cited

U.S. PATENT DOCUMENTS

2017/0134140 A1* 5/2017 Park ................. H04L 1/1812
2019/0020445 A1   1/2019 Kim et al.
(Continued)

FOREIGN PATENT DOCUMENTS

CN      106888074 A      6/2017
WO   2017/028001 A1     2/2017
(Continued)

OTHER PUBLICATIONS

NPL-3GPP TSG RAN WG1#AH 1801, Samsung, title: "Corrections on HARQ Feedback", dates Jan. 22-26, 2018 (Year: 2018).*
(Continued)

*Primary Examiner* — Lan-Huong Truong
(74) *Attorney, Agent, or Firm* — Maschoff Brennan

(57) ABSTRACT

A method for determining a HARQ-ACK codebook and a user equipment are provided. The method for determining the HARQ-ACK codebook includes: determining an HARQ-ACK codebook based on code block group configuration of a BWP where at least one PDSCH corresponding to the HARQ-ACK codebook is located; or, determining an HARQ-ACK codebook based on code block group configuration of a BWP where a PDCCH scheduling at least one PDSCH corresponding to the HARQ-ACK codebook is located.

20 Claims, 1 Drawing Sheet

--- determine an HARQ-ACK codebook based on code block group configuration of a BWP where at least one PDSCH corresponding to the HARQ-ACK codebook is located; or, determine an HARQ-ACK codebook based on code block group configuration of a BWP where a PDCCH scheduling at least one PDSCH corresponding to the HARQ-ACK codebook is located ~11

(58) Field of Classification Search
CPC ... H04L 1/1864; H04L 5/0098; H04L 1/1607; H04W 72/042
See application file for complete search history.

(56) References Cited

U.S. PATENT DOCUMENTS

| | | | |
|---|---|---|---|
| 2019/0149271 A1* | 5/2019 | Yin | H04W 88/023 370/329 |
| 2019/0181986 A1 | 6/2019 | Kitamura et al. | |
| 2019/0379489 A1 | 12/2019 | Hwang et al. | |
| 2021/0184801 A1* | 6/2021 | El Hamss | H04W 72/0446 |

FOREIGN PATENT DOCUMENTS

| | | | |
|---|---|---|---|
| WO | 2017183896 A1 | 10/2017 | |
| WO | 2017221871 A1 | 12/2017 | |
| WO | 2018131880 A1 | 7/2018 | |
| WO | 2019074410 A1 | 3/2019 | |

OTHER PUBLICATIONS

CN Office Action in Application No. 201810152064.1 dated May 25, 2020.
"HARQ-ACK codebook design for CBG-based transmission" 3GPP TSG RAN WG1 NR Ad-Hoc#2, Jun. 27, 2017.
"On remaining aspects of NR CA/DC" 3GPP TSG-RAN WG1 Meeting NR#91, Nov. 27, 2017.
"Remaining Issues on HARQ-ACK codebook" 3GPP TSG RAN WG1 Meeting AH 1801, Jan. 22, 2018.
Written Opinion and International Search Report in Application No. PCT/CN2019/074564 dated Aug. 27, 2020.
Japanese Office Action dated Nov. 9, 2021 as received in application No. 2020-565001.
"On HARQ Management" 3GPP TSG RAN1 WG1 Meeting #90bis, R1-1718645, Prague, Czech Republic, Oct. 9-13, 2017. Ericsson.
"Corrections on HARQ Feedback" 3GPP TSG RAN WG1 #AH 1801, R1-1800453 Vancouver, Canada, Jan. 22-26, 2018. Samsung.

* cited by examiner determine an HARQ-ACK codebook based on code block group configuration of a BWP where at least one PDSCH corresponding to the HARQ-ACK codebook is located; or, determine an HARQ-ACK codebook based on code block group configuration of a BWP where a PDCCH scheduling at least one PDSCH corresponding to the HARQ-ACK codebook is located ⸺11
Fig. 1
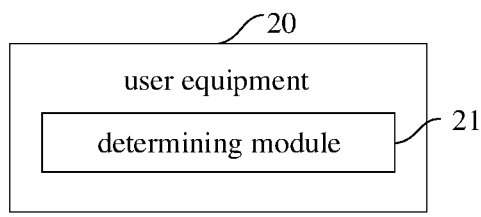
Fig. 2
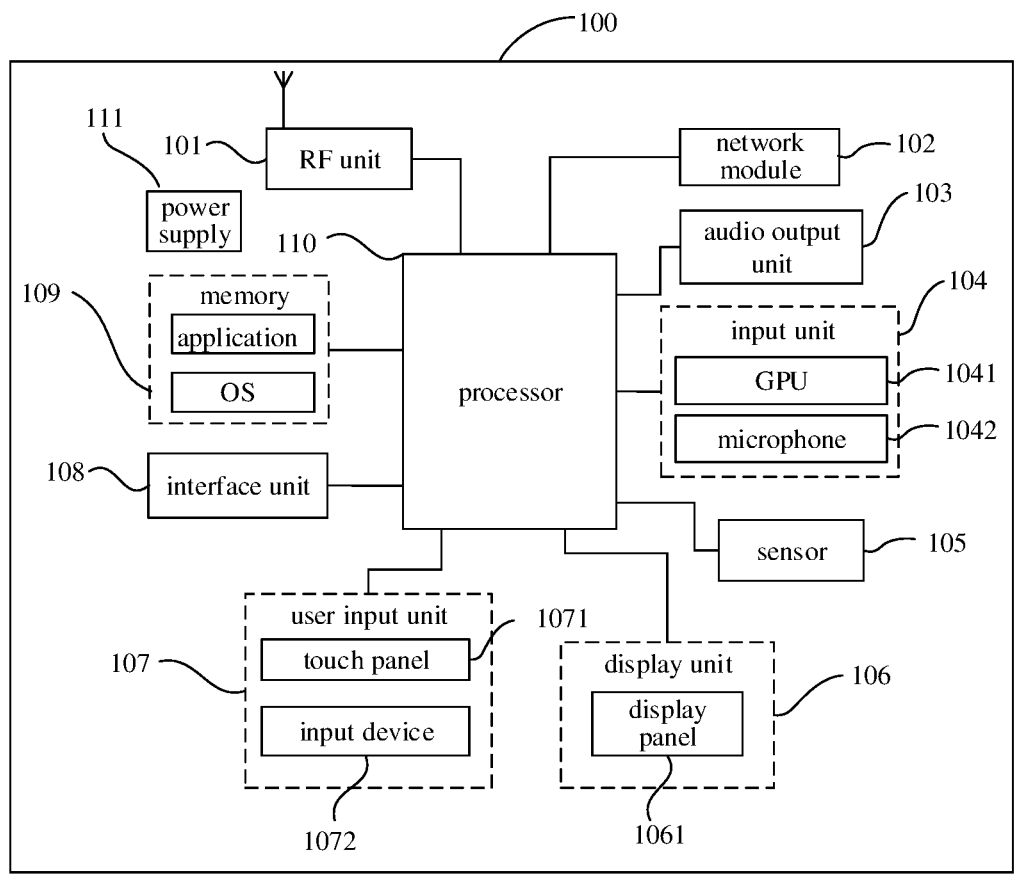
Fig. 3

METHOD FOR DETERMINING HARQ-ACK CODEBOOK AND USER EQUIPMENT

CROSS-REFERENCE TO RELATED APPLICATION

This application is the U.S. national phase of PCT Application No. PCT/CN2019/074564 filed on Feb. 2, 2019, which claims a priority to Chinese Patent Application No. 201810147546.8 filed on Feb. 12, 2018 and a priority to Chinese Patent Application No. 201810152064.1 filed on Feb. 14, 2018, the disclosures of which are incorporated in their entirety by reference herein.

TECHNICAL FIELD

Embodiments of the present disclosure relate to the field of radio communications, and in particular to a method for determining an HARQ-ACK codebook and a user equipment.

BACKGROUND

In the long term evolution (LTE) system, when a network side transmits a transport block (TB), each transport block is divided into multiple code blocks. A user equipment (UE) needs to transmit hybrid automatic repeat request (HARQ) acknowledgement/non-acknowledgement (ACK/NACK) information for the entire transport block. If a certain code block in the transport block is transmitted incorrectly, all code blocks in the entire transport block need to be retransmitted.

In standardization process of the 5th generation (5G) new ratio (NR) mobile communication system, the code block group (CBG) transmission mode is introduced. That is, code blocks of a transport block are grouped, the transport block includes multiple code block groups, and one code block group includes one or more code blocks. The user equipment can feed back ACK/NACK of each code block group according to the reception of each code block group. In this way, the network side only needs to retransmit the code block group incorrectly received by the user equipment, thereby reducing resources required for retransmission, and reducing processing latency when the user equipment receives the retransmitted data and performs merging.

When the code block group transmission mode is not configured for the user equipment, feeding back the ACK/NACK by the user equipment includes feeding back 1 bit for each transport block. When the code block group transmission mode is configured for the user equipment, the types of ACK/NACK fed back by the user equipment include transport block level (TB level) ACK/NACK and code block group level (CBG level) ACK/NACK. In this case, in the TB level ACK/NACK, the user equipment feeds back M bits for each transport block, where the various bits have the same value and each are used to indicate the ACK/NACK of the transport block. In the CBG level ACK/NACK, the user equipment feeds back M bits for each transport block, where each bit corresponds to ACK/NACK of each code block group. Specifically, the user equipment determines the type of ACK/NACK feedback according to the format of the received downlink control information (DCI) for scheduling downlink data. When the format of the DCI received by the user equipment is a fallback DCI, the type of the ACK/NACK fed back by the user equipment is TB level ACK/NACK. When the format of the DCI received by the user equipment is a normal DCI, the type of the ACK/NACK fed back by the user equipment is CBG level ACK/NACK.

In order to meet services with different demands and meet different application scenarios, subcarrier spacings of the NR system are no longer a single 15 kHz, and multiple types of subcarrier spacings can be supported, where different subcarrier spacings can be applied to different scenarios. In NR Rel-15, the maximum bandwidth of each carrier is 400 MHz. However, considering the capabilities of the user equipment, the maximum bandwidth supported by the user equipment can be less than 400 MHz, and the user equipment can operate on multiple small bandwidth parts (BWP). Each bandwidth part corresponds to a parameter set (Numerology), a bandwidth, and a frequency location. One or more BWPs can be configured for each user equipment, and the network side needs to inform the user equipment of the BWP on which the user equipment operates, that is, which BWP is activated. The active BWP can be dynamically switched through DCI.

In the frequency division dual (FDD) scenario, when the active BWP of the user equipment is switched and code block group transmission configurations of different downlink (DL) BWPs are different, transport block transmission configurations of BWPs associated with multiple physical downlink shared channels (PDSCH) in the time window are different, so the user equipment may not be able to determine the size of the HARQ-ACK codebook.

SUMMARY

Some embodiments of the present disclosure provide a method for determining a HARQ-ACK codebook and a user equipment, to solve the problem that the user equipment may not be able to determine the HARQ-ACK codebook.

To solve the above technical problem, in a first aspect, some embodiments of the present disclosure provide a method for determining a HARQ-ACK codebook, including:

determining an HARQ-ACK codebook based on code block group configuration of a bandwidth part (BWP) where at least one physical downlink shared channel (PDSCH) corresponding to the HARQ-ACK codebook is located; or, determining an HARQ-ACK codebook based on code block group configuration of a BWP where a physical downlink control channel (PDCCH) scheduling at least one PDSCH corresponding to the HARQ-ACK codebook is located.

In a second aspect, some embodiments of the present disclosure provide a user equipment, including:

a determining module, configured to determine an HARQ-ACK codebook based on code block group configuration of a bandwidth part (BWP) where at least one physical downlink shared channel (PDSCH) corresponding to the HARQ-ACK codebook is located; or, determine an HARQ-ACK codebook based on code block group configuration of a BWP where a physical downlink control channel (PDCCH) scheduling at least one PDSCH corresponding to the HARQ-ACK codebook is located.

In a third aspect, some embodiments of the present disclosure provide a user equipment including a processor, a memory, and a computer program stored on the memory and executable by the processor, where the computer program, when being executed by the processor, configure the processor to perform the steps of the method for determining the HARQ-ACK codebook.

In a fourth aspect, some embodiments of the present disclosure provide a computer readable storage medium, having a computer program stored thereon, where the computer program, when being executed by a processor, configure the processor to perform the steps of the method for determining the HARQ-ACK codebook.

In some embodiments of the present disclosure, the method of how the user equipment determines the HARQ-ACK codebook is clarified, which avoids the ambiguity that may exist when the user equipment determines the HARQ-ACK codebook after switching the BWP.

BRIEF DESCRIPTION OF THE DRAWINGS

FIG. 1 is a schematic diagram of a method for determining a HARQ-ACK codebook according to some embodiments of the disclosure;

FIG. 2 is a schematic diagram of a user equipment according to some embodiments of the present disclosure; and FIG. 3 is a schematic diagram of a user equipment according to some embodiments of the present disclosure.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

For a service that occurs periodically and has relatively fixed sizes of data packages, in order to reduce the overhead of downlink control signaling, the network may adopt a semi-persistent scheduling method to continuously allocate certain resources for transmission of periodic service. The method of semi-persistent scheduling in the downlink is referred to as DL semi-persistent scheduling (SPS). DLSPS can reduce the overhead of scheduling small VoLTE voice packages that are periodically transmitted (which mainly includes overhead of physical downlink control channel (PDCCH)), so that more resources may be used to schedule additional user equipments.

There are two ways to determine an HARQ-ACK codebook, including a semi-static method and a dynamic method. When the HARQ-ACK codebook is determined with the semi-static determination method, a size of the HARQ-ACK codebook is fixed. In this case, the size of the HARQ-ACK codebook is determined according to PDSCH reception occasions included in the time window. The size of the time window is calculated according to a parameter configured by a higher layer. Within the time window, the number of PDSCH candidates that may be received is fixed. Therefore, the size of the HARQ-ACK codebook is fixed.

When the HARQ-ACK codebook is dynamically determined, the size of the HARQ-ACK codebook may be dynamically changed. In this case, the UE determines the size of the time window according to a parameter of a higher layer, and determines the size of the HARQ-ACK codebook according to PDCCHs received in the time window. Since the number of PDCCHs received in the time window is uncertain, the size of the HARQ-ACK codebook is dynamically changed.

The method for determining the HARQ-ACK codebook in some embodiments of the present disclosure may be used to determine the semi-static HARQ-ACK codebook, and may also be used to determine the dynamic HARQ-ACK codebook.

The scenarios described in some embodiments of the present disclosure are a FDD scenario.

Reference is made to FIG. 1, which shows a method for determining an HARQ-ACK codebook according to some embodiments of the present disclosure. The method is operable by a user equipment and includes the following step.

Step 11 includes: determining an HARQ-ACK codebook based on code block group configuration of a bandwidth part (BWP) where at least one physical downlink shared channel (PDSCH) corresponding to the HARQ-ACK codebook is located; or, determining an HARQ-ACK codebook based on code block group configuration of a BWP where a physical downlink control channel (PDCCH) scheduling at least one PDSCH corresponding to the HARQ-ACK codebook is located.

The method for determining the HARQ-ACK codebook in some embodiments of the present disclosure is optionally applied to a case where the activated BWP is switched by the user equipment. In some embodiments of the present disclosure, BWPs between which switch is performed may be different BWPs of the same cell, or may be different BWPs of different cells.

In some embodiments of the present disclosure, the BWP where the PDSCH is located refers to a BWP at a reception occasion of the PDSCH, and the BWP where the PDCCH is located refers to a BWP for detecting the PDCCH.

That is, in some embodiments of the present disclosure, two methods may be used to determine the HARQ-ACK codebook.

The first method includes: determining the HARQ-ACK codebook based on the code block group configuration of the BWP where the at least one PDSCH corresponding to the HARQ-ACK codebook is located.

The second method includes: determining the HARQ-ACK codebook based on the code block group configuration of the BWP where the PDCCH scheduling the at least one PDSCH corresponding to the HARQ-ACK codebook is located.

In some embodiments of the present disclosure, the code block group configuration of the BWP includes whether the code block group transmission mode is configured for the BWP. If the code block group transmission mode is configured, the user equipment feeds back ACK/NACK with M bits for each transport block, where M is the number of code block groups configured in the transport block. If the code block group transmission mode is not configured, the user equipment feeds back a 1-bit ACK/NACK for each transport block.

In some embodiments of the present disclosure, the method for determining the HARQ-ACK codebook when the user equipment is configured with the HARQ-ACK codebook is clarified, which avoids the ambiguity that may exist when the user equipment determines the HARQ-ACK codebook after switching the BWP.

As mentioned in the above, the size of the HARQ-ACK codebook is determined according to the PDSCH reception occasions included in the time window. The size of the time window is calculated according to a parameter configured by a higher layer or a predefined parameter. Within the time window, the number of PDSCH candidates that may be received is fixed. In some embodiments of the present disclosure, the number of PDSCH reception occasions included in the time window may be one or plural. When the number of PDSCH reception occasions included in the time window is one, the number of PDSCHs corresponding to the HARQ-ACK codebook is one. When the number of PDSCH reception occasions included in the time window is plural, the number of PDSCHs corresponding to the HARQ-ACK codebook is plural. When there are multiple PDSCH reception occasions included in the time window, not every PDSCH reception occasion has PDSCH transmission occurred thereon; at some PDSCH reception occasions, there may be no PDSCH transmission; even if there is no PDSCH transmission at some PDSCH reception occasions, the user equipment always reserves HARQ-ACK bits for these PDSCH transmissions. In some embodiments of the present disclosure, a set of PDSCH reception occasions is determined according to the detection period and detection occasion of PDCCH in the time window.

Therefore, in the above, the HARQ-ACK codebook is determined according to the code block group configuration of the BWP where at least one PDSCH corresponding to the HARQ-ACK codebook is located, or the HARQ-ACK codebook is determined according to the code block group configuration of the BWP where the PDCCH scheduling the at least one PDSCH corresponding to the HARQ-ACK codebook is located. When the number of PDSCHs corresponding to the HARQ-ACK codebook is one, the "at least one" refers to one. When the number of PDSCHs corresponding to the HARQ-ACK codebook is multiple, the "at least one" refers to more than one.

The specific methods for determining the HARQ-ACK codebook according to the first method and the second method are respectively described hereinafter.

For the first method, "determining the HARQ-ACK codebook based on the code block group configuration of the BWP where the at least one PDSCH corresponding to the HARQ-ACK codebook is located" may include:

manner 1: determining the HARQ-ACK codebook based on code block group configuration of a BWP where each PDSCH corresponding to the HARQ-ACK codebook is located; or, manner 2: determining the HARQ-ACK codebook based on code block group configuration of a BWP that has a maximum number of configured code block groups and is from a BWP set formed by at least one BWP where the at least one PDSCH corresponding to the HARQ-ACK codebook is respectively located; or, manner 3: determining the HARQ-ACK codebook based on code block group configuration of a BWP where a last PDSCH corresponding to the HARQ-ACK codebook is located.

Specific determining manners for the above three manners in the first method are described with examples hereinafter.

Manner 1A

The determining the HARQ-ACK codebook based on the code block group configuration of the BWP where each PDSCH corresponding to the HARQ-ACK codebook is located includes: determining HARQ-ACK bits of each PDSCH corresponding to the HARQ-ACK codebook based on the number of code block groups in the code block group configuration of the BWP where each PDSCH corresponding to the HARQ-ACK codebook is located, and determining the HARQ-ACK codebook based on the HARQ-ACK bits of each PDSCH corresponding to the HARQ-ACK codebook.

For example, it is assumed that the number of code block groups configured for the BWP corresponding to the candidate PDSCHm as received is CBG_num(m), then the size of the HARQ-ACK codebook is: sum(CBG_num(m)×$N_{TB}$), where m=0~M−1, M is the number of all PDSCHs corresponding to the HARQ-ACK codebook, $N_{TB}$ is the number of transport blocks, and m is the serial number of the candidate PDSCHs.

Manner 2A

The determining the HARQ-ACK codebook based on the BWP that has the maximum number of configured code block groups and is from the BWP set formed by the at least one BWP where the at least one PDSCH corresponding to the HARQ-ACK codebook is respectively located includes: selecting the BWP that has the maximum number of configured code block groups, from the BWP set formed by the at least one BWP where the at least one PDSCH corresponding to the HARQ-ACK codebook is respectively located, determining HARQ-ACK bits of each PDSCH corresponding to the HARQ-ACK codebook based on the number of code block groups in the code block group configuration of the selected BWP, and determining the HARQ-ACK codebook based on the HARQ-ACK bits of each PDSCH corresponding to the HARQ-ACK codebook.

For example, it is assumed that the candidate PDSCHm is received (m=0~M−1), a BWP that has the maximum number of configured code block groups is selected from a BWP set formed by BWPs corresponding to the candidate PDSCH m, and the number of configured code block groups of the BWP with the maximum number of configured code block groups is Nmax=max(CBG_num(m)), then the size of the HARQ-ACK codebook is: M×Nmax×$N_{TB}$ where M is the number of all PDSCHs corresponding to the HARQ-ACK codebook, $N_{TB}$ is the number of transport blocks, m is the serial number of the candidate PDSCHs.

Manner 3A

The determining the HARQ-ACK codebook based on the code block group configuration of the BWP where the last PDSCH corresponding to the HARQ-ACK codebook is located includes: obtaining the number of code block groups in the code block group configuration of the BWP where the last PDSCH corresponding to the HARQ-ACK codebook is located, determining HARQ-ACK bits of each PDSCH corresponding to the HARQ-ACK codebook, and determining the HARQ-ACK codebook based on the HARQ-ACK bits of each PDSCH corresponding to the HARQ-ACK codebook.

For example, it is assumed that the candidate PDSCH (m=M−1) is received, it indicates the last PDSCH when m=M−1, and the number of code block groups configured by the BWP at this occasion is N, then the size of the HARQ-ACK codebook is: M×N×$N_{TB}$, where M is the number of all PDSCHs corresponding to the HARQ-ACK codebook, and $N_{TB}$ is the number of transport blocks.

The method of how to determine the HARQ-ACK bits of each PDSCH corresponding to the HARQ-ACK codebook based on the number of code block groups in the code block group configuration of the BWP where each PDSCH corresponding to the HARQ-ACK codebook is located in manner 1A is described hereinafter.

In some optional embodiments of the present disclosure, the determining the HARQ-ACK bits of each PDSCH corresponding to the HARQ-ACK codebook based on the number of code block groups in the code block group configuration of the BWP where each PDSCH corresponding to the HARQ-ACK codebook is located includes:

in a case that the user equipment receives, on a first BWP, downlink control information (DCI) for instructing the user equipment to switch to a second BWP, and receives a PDSCH on the second BWP, the number of HARQ-ACK bits of the PDSCH received on the second BWP is determined as $N_2 \times N_{TB}$, where $N_2$ is the number of code block groups in code block group configuration of the second BWP, and $N_{TB}$ is the number of transport blocks, wherein code block group transmission is not configured for the first BWP and code block group transmission is configured for the second BWP;

in a case that the user equipment receives, on a first BWP, DCI for instructing the user equipment to switch to a second BWP, and receives a PDSCH on the second BWP, the number of HARQ-ACK bits of the PDSCH received on the second BWP is determined as $N_{TB}$, where $N_{TB}$ is the number of transport blocks, wherein code block group transmission is configured for the first BWP and code block group transmission is not configured for the second BWP; and in a case that the user equipment receives, on a first BWP, DCI for instructing the user equipment to switch to a second BWP, and receives a PDSCH on the second BWP, the number of HARQ-ACK bits of the PDSCH received on the second BWP is determined as $N_2 \times N_{TB}$, where $N_2$ is the number of code block groups in code block group configuration of the second BWP, and $N_{TB}$ is the number of transport blocks, wherein code block group transmission is configured for the first BWP and code block group transmission is configured for the second BWP.

For the second method, "determining the HARQ-ACK codebook based on the code block group configuration of the BWP where the PDCCH scheduling the at least one PDSCH corresponding to the HARQ-ACK codebook is located" may include:

manner 1B: determining the HARQ-ACK codebook based on code block group configuration of a BWP where a PDCCH scheduling each PDSCH corresponding to the HARQ-ACK codebook is located; or, manner 2B: determining the HARQ-ACK codebook based on code block group configuration of a BWP that has a maximum number of configured code block groups and is from a BWP set formed by at least one BWP where at least one PDCCH scheduling the at least one PDSCH corresponding to the HARQ-ACK codebook is respectively located; or, manner 3B: determining the HARQ-ACK codebook based on code block group configuration of a BWP where a PDCCH scheduling a last PDSCH corresponding to the HARQ-ACK codebook is located.

Specific determining manners for the above three manners in the second method are described with examples hereinafter.

Manner 1B

The determining the HARQ-ACK codebook based on the code block group configuration of the BWP where the PDCCH scheduling each PDSCH corresponding to the HARQ-ACK codebook is located includes: determining HARQ-ACK bits of each PDSCH corresponding to the HARQ-ACK codebook based on the number of code block groups in the code block group configuration of the BWP where the PDCCH scheduling each PDSCH corresponding to the HARQ-ACK codebook is located, and determining the HARQ-ACK codebook based on the HARQ-ACK bits of each PDSCH corresponding to the HARQ-ACK codebook.

For example, for the PDCCH of the PDSCH received at candidate occasion m, the number of configured code block groups of the BWP when the UE detects the PDCCH is CBG_num(m), then the size of the HARQ-ACK codebook is: sum(CBG_num(m)×$N_{TB}$), where m=0~M−1, CBG_num (m)=1 indicates TB transmission mode, CBG_num(m)>1 indicates CBG transmission mode, M is the number of all PDSCHs corresponding to the HARQ-ACK codebook, and $N_{TB}$ is the number of transport blocks.

Manner 2B

The determining the HARQ-ACK codebook based on the code block group configuration of the BWP that has the maximum number of configured code block groups and is from the BWP set formed by the at least one BWP where the at least one PDCCH scheduling the at least one PDSCH corresponding to the HARQ-ACK codebook is respectively located includes: selecting the BWP with the maximum number of configured code block groups, from the BWP set formed by the at least one BWP where the at least one PDCCH scheduling the at least one PDSCH corresponding to the HARQ-ACK codebook is respectively located, determining HARQ-ACK bits of each PDSCH corresponding to the HARQ-ACK codebook based on the number of code block groups in the code block group configuration of the selected BWP, and determining the HARQ-ACK codebook based on the HARQ-ACK bits of each PDSCH corresponding to the HARQ-ACK codebook.

For example, for the BWP where the PDCCH of the candidate PDSCHm as received is located (m=0~M−1), the BWP with the largest number of configured code block groups is selected from the BWP set formed by the BWPs, and the number of configured code block groups of the BWP with the largest number of configured code block groups is Nmax=max(CBG_num(m)), then the size of the HARQ-ACK codebook is: M×Nmax×$N_{TB}$, where M is the number of all PDSCHs corresponding to the HARQ-ACK codebook, $N_{TB}$ is the number of transport blocks, and m is the serial number of the candidate PDSCH.

Manner 3B

The determining the HARQ-ACK codebook based on the code block group configuration of the BWP where the PDCCH scheduling the last PDSCH corresponding to the HARQ-ACK codebook is located includes: obtaining the number of code block groups in the code block group configuration of the BWP where the PDCCH scheduling the last PDSCH corresponding to the HARQ-ACK codebook is located, determining HARQ-ACK bits of each PDSCH corresponding to the HARQ-ACK codebook, and determining the HARQ-ACK codebook based on the HARQ-ACK bits of each PDSCH corresponding to the HARQ-ACK codebook.

For example, for the BWP where the PDCCH of the PDSCH received at candidate occasion M−1 is located, the number of configured code block groups of the BWP at this occasion is N, then the size of the HARQ-ACK codebook is: M×N×$N_{TB}$, where M is the number of all PDSCHs corresponding to the HARQ-ACK codebook, and $N_{TB}$ is the number of transport blocks.

The method of how to determine HARQ-ACK bits of each PDSCH corresponding to the HARQ-ACK codebook based on the number of code block groups in the code block group configuration of the BWP where the PDCCH scheduling each PDSCH corresponding to the HARQ-ACK codebook is located in manner 1B is described hereinafter.

In some optional embodiments of the present disclosure, the determining the HARQ-ACK bits of each PDSCH corresponding to the HARQ-ACK codebook based on the number of code block groups in the code block group configuration of the BWP where the PDCCH scheduling each PDSCH corresponding to the HARQ-ACK codebook is located includes:

in a case that the user equipment receives, on a first BWP, downlink control information (DCI) for instructing the user equipment to switch to a second BWP, and receives a PDSCH on the second BWP, the number of HARQ-ACK bits of the PDSCH received on the second BWP is determined as $N_1 \times N_{TB}$, where $N_1$ is the number of code block groups in code block group configuration of the first BWP, and $N_{TB}$ is the number of transport blocks, wherein code block group transmission is not configured for the first BWP and code block group transmission is configured for the second BWP;

in a case that the user equipment receives, on a first BWP, DCI for instructing the user equipment to switch to a second BWP, and receives a PDSCH on the second BWP, the number of HARQ-ACK bits of the PDSCH received on the second BWP is determined as $N_{TB}$, where $N_{TB}$ is the number of transport blocks, wherein code block group transmission is configured for the first BWP and code block group transmission is not configured for the second BWP; and in a case that the user equipment receives, on a first BWP, DCI for instructing the user equipment to switch to a second BWP, and receives a PDSCH on the second BWP, the number of HARQ-ACK bits of the PDSCH received on the second BWP is determined as $N_1 \times N_{TB}$, where $N_1$ is the number of code block groups in code block group configuration of the first BWP, and $N_{TB}$ is the number of transport blocks, wherein code block group transmission is configured for the first BWP and code block group transmission is configured for the second BWP.

The HARQ-ACK codebook may also include: the type of ACK/NACK being TB level ACK/NACK or CBG level ACK/NACK. When the types of the received DCI are different, different types of ACK/NACK may be used, which is illustrated with examples hereinafter.

First Scenario

In some specific embodiments, in a case that the user equipment receives, on a first BWP, downlink control information (DCI) for instructing the user equipment to switch to a second BWP, and receives a PDSCH on the second BWP, wherein code block group transmission is not configured for the first BWP and code block group transmission is configured for the second BWP:

(1) if it is determined, according to the code block group configuration of the BWP (i.e., the second BWP) where at least one PDSCH corresponding to the HARQ-ACK codebook is located, that the number of HARQ-ACK bits of the PDSCH received on the second BWP is $N_2 \times N_{TB}$, where $N_2$ is the number of configured code block groups of the second BWP, and $N_{TB}$ is the number of transport blocks;

in this case, the user equipment feeds back TB level ACK/NACK, that is, the number of HARQ-ACK bits fed back is $N_2 \times N_{TB}$, $N_2$ ACK/NACKs are fed back for each transport block, $N_2$ is the number of configured code block groups of the second BWP, and the values of the $N_2$ ACK/NACKs are the same;

(2) if it is determined, according to the code block group configuration of the BWP (i.e., the first BWP) where the PDCCH scheduling the at least one PDSCH corresponding to the HARQ-ACK codebook is located, that the number of HARQ-ACK bits of the PDSCH received on the second BWP is the number of transport blocks;

in this case, regardless of whether the DCI is a fallback DCI or a normal DCI (that is, not a fallback DCI), the user equipment feeds back TB level ACK/NACK according to the code block group configuration of the BWP where the PDCCH of at least one PDSCH is located, that is, the number of HARQ-ACK bits as fed back is the number of transport blocks.

Second Scenario

In some specific embodiments, in a case that the user equipment receives, on a first BWP, downlink control information (DCI) for instructing the user equipment to switch to a second BWP, and receives a PDSCH on the second BWP, wherein code block group transmission is configured for the first BWP and code block group transmission is not configured for the second BWP:

(1) if it is determined, according to the code block group configuration of the BWP (i.e., the second BWP) where at least one PDSCH corresponding to the HARQ-ACK codebook is located, that the number of HARQ-ACK bits of the PDSCH received on the second BWP is the number of transport blocks;

in this case, regardless of whether the DCI is a normal DCI or a fallback DCI, the user equipment determines that the number of HARQ-ACK bits fed back is $N_{TB}$, and $N_{TB}$ is the number of transport blocks.

(2) if it is determined, according to the code block group configuration of the BWP (i.e., the first BWP) where the PDCCH scheduling the at least one PDSCH corresponding to the HARQ-ACK codebook is located, that the number of HARQ-ACK bits of the PDSCH received on the second BWP is $N_1 \times N_{TB}$, where $N_1$ is the number of configured code block groups of the first BWP, and $N_{TB}$ is the number of transport blocks;

in this case, regardless of whether the DCI is a fallback DCI or a normal DCI, the user equipment feeds back TB level ACK/NACK, that is, the number of HARQ-ACK bits fed back is $N_1 \times N_{TB}$, $N_1$ ACK/NACKs are fed back for each transport block, $N_1$ is the number of configured code block groups of the first BWP, and the values of the $N_1$ ACK/NACKs are the same.

The above two embodiments related to a method in which the user equipment determines HARQ-ACK bits of the PDSCH in a case that the user equipment switches between two BWPs having two different code block group configurations. The method in which the user equipment determines HARQ-ACK bits of the PDSCH in a case that the user equipment switches between two BWPs that are configured with code block group configuration is described hereinafter.

Third Scenario

In some specific embodiments, when the activated BWP is switched by the user equipment, the determining the HARQ-ACK codebook based on the code block group configuration of the BWP where the at least one PDSCH corresponding to the HARQ-ACK codebook is located or based on the code block group configuration of the BWP where the PDCCH scheduling the at least one PDSCH corresponding to the HARQ-ACK codebook is located includes:

in a case that the user equipment receives, on a first BWP, DCI for instructing the user equipment to switch to a second BWP, and receives a PDSCH on the second BWP, wherein code block group transmission is configured for the first BWP and code block group transmission is configured for the second BWP (in some embodiments of the present disclosure, the number of configured code block groups of the first BWP is different from the number of configured code block groups of the second BWP, and it is assumed that the number of configured code block groups of the first BWP is $N_1$, and the number of configured code block groups of the second BWP is $N_2$), (1) if it is determined, according to the code block group configuration of the BWP (i.e., the second BWP) where at least one PDSCH corresponding to the HARQ-ACK codebook is located, that the number of HARQ-ACK bits of the PDSCH received on the second BWP is $N_2 \times N_{TB}$, where $N_2$ is the number of configured code block groups of the second BWP, and $N_{TB}$ is the number of transport blocks;

in this case, if the DCI is a normal DCI, the user equipment feeds back CBG level ACK/NACK or TB level ACK/NACK, that is, the number of HARQ-ACK bits fed back is $N_2 \times N_{TB}$, and $N_2$ ACK/NACKs are fed back for each transport block. NACK, where $N_2$ is the number of configured code block groups of the first BWP;

specifically, if $N_1 > N_2$ the user equipment feeds back TB level ACK/NACK;

if $N_1 \Leftarrow N_2$, the user equipment feeds back CBG level ACK/NACK, the first $N_1$ bits in $N_2$ bits are used as ACK/NACK and the others are filled with 0 or 1, or, the last $N_1$ bits in $N_2$ bits are used as ACK/NACK and the others are filled with 0 or 1;

if the DCI is a fallback DCI, the user equipment feeds back TB level ACK/NACK, that is, the number of HARQ-ACK bits fed back is $N_2 \times N_{TB}$, $N_2$ ACK/NACKs are fed back for each transport block, $N_2$ is the number of configured code block groups of the first BWP, and the values of the $N_2$ ACK/NACKs are the same;

(2) if it is determined, according to the code block group configuration of the BWP (i.e., the first BWP) where the PDCCH scheduling the at least one PDSCH corresponding to the HARQ-ACK codebook is located, that the number of HARQ-ACK bits of the PDSCH received on the second BWP is $N_1 \times N_{TB}$, where $N_1$ is the number of configured code block groups of the first BWP, and $N_{TB}$ is the number of transport blocks;

in this case, if the DCI is a normal DCI, the user equipment feeds back CBG level ACK/NACK, that is, the number of HARQ-ACK bits fed back is $N_1 \times N_{TB}$, $N_1$ ACK/NACKs are fed back for each transport block, $N_1$ is the number of configured code block groups of the first BWP;

if the DCI is a fallback DCI, the user equipment feeds back TB level ACK/NACK, that is, the number of HARQ-ACK bits fed back is $N_1 \times N_{TB}$, $N_1$ ACK/NACKs are fed back for each transport block, $N_1$ is the number of configured code block groups of the first BWP, and the values of the $N_1$ ACK/NACKs are the same.

In some embodiments of the present disclosure, the number of configured code block groups of the BWP may be configured through a high layer signaling.

In some embodiments of the present disclosure, the determined HARQ-ACK codebook only includes HARQ-ACK bits of at least one PDSCH received on a same BWP, or, includes HARQ-ACK bits of at least one PDSCH received on BWPs having same code block group configuration.

In some embodiments of the present disclosure, the BWPs with the same code block group configuration refer to BWPs at least having the same number of configured code block groups.

That is, for one or more PDSCHs received on different BWPs, the user equipment does not feed back HARQ-ACK, that is, the HARQ-ACK codebook does not include ACK/NACK of the one or more PDSCHs.

Further, for one or more PDSCHs received on different BWPs in a case of code block configurations of different BWPs being different, the user equipment does not feed back HARQ-ACK, that is, the HARQ-ACK codebook does not include ACK/NACK of the one or more PDSCHs.

In some optional embodiments of the present disclosure, the determined HARQ-ACK codebook only includes HARQ-ACK bits of at least one PDSCH received on a same BWP, and the method for determining the HARQ-ACK codebook in some embodiments of the present disclosure may include:

in a case that an active BWP is switched by the user equipment, the determined HARQ-ACK codebook only includes HARQ-ACK corresponding to at least one PDSCH received on a currently activated BWP.

That is, before feeding back HARQ-ACK of the PDSCH corresponding to the HARQ-ACK codebook, if the active BWP is switched by the user equipment, then HARQ-ACK of a PDSCH before the switch is not fed back, and only HARQ-ACK of a PDSCH after the switch is fed back.

In some optional embodiments of the present disclosure, in a case that the active BWP is switched by the user equipment and code block group configuration of the BWP before the switch and code block group configuration of the BWP after the switch are different, the determined HARQ-ACK codebook only includes HARQ-ACK bits corresponding to the PDSCH received on the currently activated BWP.

In some optional embodiments of the present disclosure, the determined HARQ-ACK codebook only includes HARQ-ACK bits of at least one PDSCH received on a same BWP, and the method for determining the HARQ-ACK codebook in some embodiments of the present disclosure may include: in a case that an active BWP is switched by the user equipment, the determined HARQ-ACK codebook only includes HARQ-ACK corresponding to at least one PDSCH received on the BWP before the switch.

That is, before feeding back the HARQ-ACK of the PDSCH corresponding to the HARQ-ACK codebook, if the active BWP is switched by the user equipment, only HARQ-ACK of a PDSCH before the switch is fed back, and HARQ-ACK of a PDSCH after the switch is not fed back.

In some optional embodiments of the present disclosure, the determined HARQ-ACK codebook only including the HARQ-ACK corresponding to the at least one PDSCH received on the BWP before the switch in a case that the active BWP is switched by the user equipment, includes:

in a case that the active BWP is switched by the user equipment and code block group configuration of the BWP before the switch and code block group configuration of the BWP after the switch are different, the determined HARQ-ACK codebook only includes HARQ-ACK corresponding to the at least one PDSCH received on the BWP before the switch.

In some optional embodiments of the present disclosure, the method for determining the HARQ-ACK codebook in some embodiments of the present disclosure may further include: feeding back the HARQ-ACK codebook; and the method further includes: ignoring an instruction before feeding back HARQ-ACK bits corresponding to the PDSCH corresponding to the HARQ-ACK codebook, in a case that the user equipment receives the instruction used to indicate switching an active BWP.

In other words, the user equipment is not allowed to perform BWP switching before feeding back HARQ-ACK bits of the PDSCH corresponding to the HARQ-ACK codebook. The BWP switching may be performed after the HARQ-ACK bits of the PDSCH corresponding to the HARQ-ACK codebook are fed back.

In some optional embodiments of the present disclosure, the instruction is ignored before feeding back HARQ-ACK bits corresponding to the PDSCH corresponding to the HARQ-ACK codebook, in a case that the user equipment receives the instruction used to indicate switching the active BWP, and code block group configuration of the BWP before the switch and code block group configuration of a BWP after the switch are different.

Reference is made to FIG. 2. Based on the same inventive concept, some embodiments of the present disclosure further provide a user equipment 20, including:

a determining module 21, configured to determine an HARQ-ACK codebook, based on code block group configuration of a bandwidth part (BWP) where at least one physical downlink shared channel (PDSCH) corresponding to the HARQ-ACK codebook is located, or, based on code block group configuration of a BWP where a physical downlink control channel (PDCCH) scheduling at least one PDSCH corresponding to the HARQ-ACK codebook is located.

In the above embodiments, the determining module 21 may include:

a first execution unit, configured to determine the HARQ-ACK codebook based on code block group configuration of a BWP where each PDSCH corresponding to the HARQ-ACK codebook is located; or, a second execution unit, configured to determine the HARQ-ACK codebook based on code block group configuration of a BWP that has a maximum number of configured code block groups and is from a BWP set formed by BWP(s) where PDSCH(s) corresponding to the HARQ-ACK codebook are respectively located; or, a third execution unit, configured to determine the HARQ-ACK codebook based on code block group configuration of a BWP where a last PDSCH corresponding to the HARQ-ACK codebook is located.

In the above embodiments, the determining module 21 may include:

a fourth execution unit, configured to determine the HARQ-ACK codebook based on code block group configuration of a BWP where a PDCCH scheduling each PDSCH corresponding to the HARQ-ACK codebook is located; or, a fifth execution unit, configured to determine the HARQ-ACK codebook based on code block group configuration of a BWP that has a maximum number of configured code block groups and is from a BWP set formed by BWP(s) where PDCCH(s) scheduling PDSCH(s) corresponding to the HARQ-ACK codebook are respectively located; or, a sixth execution unit, configured to determine the HARQ-ACK codebook based on code block group configuration of a BWP where a PDCCH scheduling a last PDSCH corresponding to the HARQ-ACK codebook is located.

In the above embodiments, optionally:

the first execution unit is configured to determine HARQ-ACK bits of each PDSCH corresponding to the HARQ-ACK codebook based on the number of code block groups in the code block group configuration of the BWP where each PDSCH corresponding to the HARQ-ACK codebook is located, and determine the HARQ-ACK codebook based on the HARQ-ACK bits of each PDSCH corresponding to the HARQ-ACK codebook;

the second execution unit is configured to select the BWP that has the maximum number of configured code block groups, from the BWP set formed by the at least one BWP where the at least one PDSCH corresponding to the HARQ-ACK codebook is located, determine HARQ-ACK bits of each PDSCH corresponding to the HARQ-ACK codebook based on the number of code block groups in the code block group configuration of the selected BWP, and determine the HARQ-ACK codebook based on the HARQ-ACK bits of each PDSCH corresponding to the HARQ-ACK codebook; and the third execution unit is configured to obtain the number of code block groups in the code block group configuration of the BWP where the last PDSCH corresponding to the HARQ-ACK codebook is located, determine HARQ-ACK bits of each PDSCH corresponding to the HARQ-ACK codebook, and determine the HARQ-ACK codebook based on the HARQ-ACK bits of each PDSCH corresponding to the HARQ-ACK codebook.

In the above embodiments, optionally:

the fourth execution unit is configured to determine HARQ-ACK bits of each PDSCH corresponding to the HARQ-ACK codebook based on the number of code block groups in the code block group configuration of the BWP where the PDCCH scheduling each PDSCH corresponding to the HARQ-ACK codebook is located, and determine the HARQ-ACK codebook based on the HARQ-ACK bits of each PDSCH corresponding to the HARQ-ACK codebook;

the fifth execution unit is configured to select the BWP with the maximum number of configured code block groups, from the BWP set formed by the at least one BWP where the at least one PDCCH scheduling the at least one PDSCH corresponding to the HARQ-ACK codebook is located, determine HARQ-ACK bits of each PDSCH corresponding to the HARQ-ACK codebook based on the number of code block groups in the code block group configuration of the selected BWP, and determine the HARQ-ACK codebook based on the HARQ-ACK bits of each PDSCH corresponding to the HARQ-ACK codebook; and the sixth execution unit is configured to obtain the number of code block groups in the code block group configuration of the BWP where the PDCCH scheduling the last PDSCH corresponding to the HARQ-ACK codebook is located, determine HARQ-ACK bits of each PDSCH corresponding to the HARQ-ACK codebook, and determine the HARQ-ACK codebook based on the HARQ-ACK bits of each PDSCH corresponding to the HARQ-ACK codebook.

In the above embodiments, optionally:

the first execution unit is configured to:

in a case that the user equipment receives, on a first BWP, downlink control information (DCI) for instructing the user equipment to switch to a second BWP and receives a PDSCH on the second BWP, determine the number of HARQ-ACK bits of the PDSCH received on the second BWP as $N_2 \times N_{TB}$, where $N_2$ is the number of code block groups in code block group configuration of the second BWP, and $N_{TB}$ is the number of transport blocks, wherein code block group transmission is not configured for the first BWP and code block group transmission is configured for the second BWP;

in a case that the user equipment receives, on a first BWP, DCI for instructing the user equipment to switch to a second BWP and receives a PDSCH on the second BWP, determine the number of HARQ-ACK bits of the PDSCH received on the second BWP as $N_{TB}$, where $N_{TB}$ is the number of transport blocks, wherein code block group transmission is configured for the first BWP and code block group transmission is not configured for the second BWP; and in a case that the user equipment receives, on a first BWP, DCI for instructing the user equipment to switch to a second BWP and receives a PDSCH on the second BWP, determine the number of HARQ-ACK bits of the PDSCH received on the second BWP as $N_2 \times N_{TB}$, where $N_2$ is the number of code block groups in code block group configuration of the second BWP, and $N_{TB}$ is the number of transport blocks, wherein code block group transmission is configured for the first BWP and code block group transmission is configured for the second BWP.

In the above embodiments, optionally:

the fourth execution unit is configured to:

in a case that the user equipment receives, on a first BWP, downlink control information (DCI) for instructing the user equipment to switch to a second BWP and receives a PDSCH on the second BWP, determine the number of HARQ-ACK bits of the PDSCH received on the second BWP as $N_1 \times N_{TB}$, where $N_1$ is the number of code block groups in code block group configuration of the first BWP, and $N_{TB}$ is the number of transport blocks, wherein code block group transmission is not configured for the first BWP and code block group transmission is configured for the second BWP;

in a case that the user equipment receives, on a first BWP, DCI for instructing the user equipment to switch to a second BWP and receives a PDSCH on the second BWP, determine the number of HARQ-ACK bits of the PDSCH received on the second BWP as $N_{TB}$, where $N_{TB}$ is the number of transport blocks, wherein code block group transmission is configured for the first BWP and code block group transmission is not configured for the second BWP; and in a case that the user equipment receives, on a first BWP, DCI for instructing the user equipment to switch to a second BWP and receives a PDSCH on the second BWP, determine the number of HARQ-ACK bits of the PDSCH received on the second BWP as $N_1 \times N_{TB}$, where $N_1$ is the number of code block groups in code block group configuration of the first BWP, and $N_{TB}$ is the number of transport blocks, wherein code block group transmission is configured for the first BWP and code block group transmission is configured for the second BWP.

In some embodiments of the present disclosure, optionally, the determined HARQ-ACK codebook only includes HARQ-ACK bits of at least one PDSCH received on a same BWP, or, includes HARQ-ACK bits of at least one PDSCH received on BWPs having same code block group configuration.

Optionally, in a case that the determined HARQ-ACK codebook only includes HARQ-ACK bits of at least one PDSCH received on a same BWP, the determining module is further configured to: in a case that an active BWP is switched by the user equipment, determine that the HARQ-ACK codebook only includes HARQ-ACK corresponding to at least one PDSCH received on a currently activated BWP.

Optionally, the determining module is further configured to: in a case that the active BWP is switched by the user equipment and code block group configuration of the BWP before the switch and code block group configuration of the BWP after the switch are different, determine that the HARQ-ACK codebook only includes HARQ-ACK bits corresponding to the PDSCH received on the currently activated BWP.

Optionally, in a case that the determined HARQ-ACK codebook only includes HARQ-ACK bits of at least one PDSCH received on a same BWP, the determining module is configured to: in a case that an active BWP is switched by the user equipment, determine that the HARQ-ACK codebook only includes HARQ-ACK corresponding to at least one PDSCH received on the BWP before the switch.

Optionally, the determining module is configured to: in a case that the active BWP is switched by the user equipment and code block group configuration of the BWP before the switch and code block group configuration of the BWP after the switch are different, determine that the HARQ-ACK codebook only includes HARQ-ACK corresponding to the at least one PDSCH received on the BWP before the switch.

Optionally, the user equipment of some embodiments of the present disclosure may further include:

a feedback module, configure to feed back the HARQ-ACK codebook; and a processing module, configured to: ignore an instruction before feeding back HARQ-ACK bits corresponding to the PDSCH corresponding to the HARQ-ACK codebook, in a case that the user equipment receives the instruction used to indicate switching an active BWP.

Optionally, the processing module is configured to: ignore the instruction before feeding back the HARQ-ACK bits corresponding to the PDSCH corresponding to the HARQ-ACK codebook, in a case that the user equipment receives the instruction used to indicate switching the active BWP, and code block group configuration of the BWP before the switch and code block group configuration of a BWP after the switch are different.

The user equipment provided by some embodiments of the present disclosure can implement each process implemented by the user equipment in the method embodiments in FIG. 1, which is not described in detail herein to avoid repetition.

FIG. 3 is a schematic diagram of a hardware structure of a user equipment for implementing various embodiments of the present disclosure. The user equipment 100 includes, but is not limited to, a radio frequency unit 101, a network module 102, an audio output unit 103, an input unit 104, a sensor 105, a display unit 106, a user input unit 107, an interface unit 108, a memory 109, a processor 110, and a power supply 1011, etc. Those skilled in the art can understand that the structure of the user equipment shown in FIG. 3 does not constitute a limitation to the user equipment, and the user equipment may include more or fewer components than those shown in the figure, or have some components combined, or use a different arrangement of the components. In some embodiments of the present disclosure, the user equipment includes, but is not limited to, a mobile phone, a tablet computer, a notebook computer, a palmtop computer, a vehicle-mounted terminal, a wearable device, a pedometer, or the like.

The processor 110 is configured to determine an HARQ-ACK codebook based on code block group configuration of a bandwidth part (BWP) where at least one physical downlink shared channel (PDSCH) corresponding to the HARQ-ACK codebook is located; or, determine an HARQ-ACK codebook based on code block group configuration of a BWP where a physical downlink control channel (PDCCH) scheduling at least one PDSCH corresponding to the HARQ-ACK codebook is located.

In some embodiments of the present disclosure, the method for determining the HARQ-ACK codebook when the user equipment is configured with the HARQ-ACK codebook is clarified, to solve the problem that incorrect transmission of HARQ-ACK is caused by the fact that the user equipment cannot determine the size of the HARQ-ACK codebook.

It should be understood that, in the embodiments of the present disclosure, the radio frequency unit 101 may be configured to receive and send information, or to receive and send signals in a call. Specifically, the radio frequency unit 101 delivers the downlink data received from a base station to the processor 110; and transmits the uplink data to the base station. Generally, the radio frequency unit 101 includes, but is not limited to, an antenna, at least one amplifier, a transceiver, a coupler, a low noise amplifier, a duplexer, or the like. In addition, the radio frequency unit 101 may communicate with a network or other devices via a wireless communication system.

The user equipment provides users with wireless broadband Internet access via the network module 102, such as helping users send and receive emails, browse web pages and access streaming media.

The audio output unit 103 may convert audio data received by the radio frequency unit 101 or the network module 102 or stored in the memory 109 into audio signals and output them as sound. Moreover, the audio output unit 103 may provide audio output (for example, call signal reception sound, message reception sound, etc.) related to a specific function performed by the user equipment 100. The audio output unit 103 includes a speaker, a buzzer, a receiver, or the like.

The input unit 104 is configured to receive audio or video signals. The input unit 104 may include a graphics processing unit (GPU) 1041 and a microphone 1042. The graphics processing unit 1041 is configured to process image data of still pictures or videos obtained via an image capture device (such as a camera) in an image capture mode or a video capture mode. The processed image frames may be displayed in the display unit 106. The image frames processed by the graphics processing unit 1041 may be stored in the memory 109 (or other storage medium) or transmitted via the radio frequency unit 101 or the network module 102. The microphone 1042 may receive sound, and may process the sound into audio data. The processed audio data may be converted into a format for outputting that can be transmitted via the radio frequency unit 101 to a mobile communication base station in the case of a telephone call mode.

The user equipment 100 further includes at least one sensor 105, such as an optical sensor, a motion sensor, or other sensors. Specifically, the optical sensor includes an ambient light sensor and a proximity sensor. The ambient light sensor may adjust brightness of the display panel 1061 according to the brightness of the ambient light, and the proximity sensor may close the display panel 1061 and/or backlight when the user equipment 100 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identifying the pose of the user equipment (such as switching of horizontal and vertical screen, a correlated game, magnetometer pose calibration), a function about vibration recognition (such as pedometer, tapping). The sensor 105 may include a fingerprint sensor, a pressure sensor, an iris sensor, a molecular sensor, a gyroscope, a barometer, a hygrometer, a thermometer, an infrared sensor, or the like, which are not described herein.

The display unit 106 is configured to display information inputted by the user or information provided for the user. The display unit 106 may include a display panel 1061. The display panel 1061 may be configured in the form of a liquid crystal display (LCD), an organic light-emitting diode (OLED), or the like.

The user input unit 107 may be configured to receive inputted numeric or character information, and generate key signal inputs related to user settings and function control of the user equipment. Specifically, the user input unit 107 includes a touch panel 1071 and other input device 1072. The touch panel 1071, also known as a touch screen, may collect a touch operation of a user thereon or thereby (for example, an operation on or around the touch panel 1071 that is made by a user with a finger, a touch pen or any other suitable object or accessory). The touch panel 1071 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 110. The touch controller may receive a command from the processor 110 and executes the command In addition, the touch panel 1071 may be implemented by various types such as a resistive panel, a capacitive panel, an infrared panel, or a surface acoustic wave panel. In addition to the touch panel 1071, the user input unit 107 may include other input device 1072. Specifically, the other input device 1072 may include, but is not limited to, a physical keyboard, a function key (such as a volume control key, a switch key), a trackball, a mouse, or a joystick, which are not described herein.

Further, the display panel 1061 may be covered by the touch panel 1071. When the touch panel 1071 detects a touch operation on or near the touch panel 1071, the touch panel 1071 transmits the touch operation to the processor 110 to determine the type of the touch event, and the processor 110 provides a corresponding visual output in the display panel 1061 according to the type of touch event. Although the touch panel 1071 and the display panel 1061 are implemented as two independent components to implement the input and output functions of the user equipment in FIG. 3, in some embodiments, the touch panel 1071 and the display panel 1061 may be integrated to implement the input and output functions of the user equipment, which are not limited herein.

The interface unit 108 is an interface through which an external device is connected to the user equipment 100. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 108 may be configured to receive input (e.g., data information, power, etc.) from an external device and transmit the received input to one or more elements in the user equipment 100 or may be configured to transmit data between the user equipment 100 and the external device.

The memory 109 may be configured to store software programs and various data. The memory 109 may mainly include a program storage region and a data storage region, where the program storage region may store an operating system, an application (such as a sound playback function, an image playback function, etc.) required for at least one function; the data storage region may store data (such as audio data, a phone book, etc.) created according to the use of the mobile phone. In addition, the memory 109 may include a high-speed random access memory, and may include a non-volatile memory, such as at least one magnetic disk storage device, a flash memory device, or other volatile solid-state storage device.

The processor 110 is a control center of the user equipment, which uses various interfaces and lines to connect various parts of the entire user equipment. The processor 110 runs or executes software programs and/or modules stored in the memory 109 and calls data stored in the memory 109, to execute various functions of the user equipment and process data, so as to monitor the user equipment as a whole. The processor 110 may include one or more processing units. Optionally, the processor 110 may integrate an application processor and a modem processor. The application processor mainly processes an operating system, a user interface, an application, etc., and the modem processor mainly processes wireless communications. It can be understood that the foregoing modem processor may not be integrated into the processor 110.

The user equipment 100 may further include a power supply 111 (such as a battery) for supplying power to various components. Optionally, the power supply 111 may be logically connected to the processor 110 through a power management system, so as to implement functions, such as management of charging and discharging, and power consumption management, via the power management system.

In addition, the user equipment 100 may include some functional modules that are not shown, which are not described herein.

Some embodiments of the present disclosure provide a user equipment including a processor, a memory, and a computer program stored on the memory and executable by the processor, where the computer program, when being executed by the processor, performs various processes of the above embodiments of the method for determining the HARQ-ACK codebook, and the same technical effects can be achieved, which is not repeated herein to avoid repetition.

The user equipment in some embodiments of the present disclosure may be a wireless user equipment or a wired user equipment. The wireless user equipment may be a device that provides voice and/or other service data connectivity to the user, a handheld device with wireless connection function, or other processing equipment connected to a wireless modem. The wireless user equipment may communicate with one or more core networks via a radio access network (RAN). The wireless user equipment may be a mobile terminal, such as a mobile phone (or called a "cellular" phone) and a computer with a mobile terminal. For example, it may be a portable, pocket-sized, handheld, computer-built-in or vehicle-mounted mobile device, which exchange language and/or data with the radio access network. For example, it may be Personal Communication Service (PCS) phone, cordless phone, Session Initiation Protocol (SIP) phone, Wireless Local Loop (WLL) station, Personal Digital Assistant (PDA) or other equipment. The wireless user equipment may also be referred to as a system, a subscriber unit, a subscriber station, a mobile station, a mobile, a remote station, a remote terminal, an access terminal, a user terminal, a user agent, a user device or a user equipment, which are not limited herein.

Some embodiments of the present disclosure also provide a computer readable storage medium. A computer program is stored in the computer readable storage medium. The computer program, when being executed by a processor, performs various processes of the above embodiments of the method for determining the HARQ-ACK codebook, which can achieve the same technical effects. To avoid repetition, details are not described herein. The computer readable storage medium in some embodiments of the present disclosure may be a volatile computer readable storage medium or a non-volatile computer readable storage medium, or may include both a volatile computer readable storage medium and a non-volatile computer readable storage medium, such as a read-only memory (ROM), a random access memory (RAM), a magnetic disk or an optical disk, etc.

It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments may be implemented by means of software plus a needed universal hardware platform, and also may be implemented by hardware, but in many cases the former is preferred. Based on this understanding, the technical solution of the present disclosure that is essential or contributes to the related technologies may be embodied in the form of a software product that is stored in a storage medium (such as a ROM/RAM, a magnetic disk, or an optical disc), which includes instructions for enabling a terminal (which may be a mobile phone, a computer, a server, an air conditioner, or a network device) to execute the method described in the embodiments of the present disclosure.

The embodiments of the present disclosure are described in the above with reference to the drawings, and the present disclosure is not limited to the above specific implementations. The above specific implementations are illustrative rather than restrictive. Various forms can be made by those of ordinary skill in the art under the inspiration of the present disclosure, without departing from the purpose of the present disclosure and the protection scope of the claims, all of which fall within the protection of the present disclosure.

What is claimed is:

1. A method for determining a hybrid automatic repeat request-acknowledgement (HARQ-ACK) codebook, operable by a user equipment, comprising:
    determining an HARQ-ACK codebook based on code block group configuration of a bandwidth part (BWP) where at least one physical downlink shared channel (PDSCH) corresponding to the HARQ-ACK codebook is located; or,
    determining an HARQ-ACK codebook based on code block group configuration of a BWP where a physical downlink control channel (PDCCH) scheduling at least one PDSCH corresponding to the HARQ-ACK codebook is located;
    wherein the determined HARQ-ACK codebook only comprises HARQ-ACK bits of at least one PDSCH received on a same BWP, or, comprises HARQ-ACK bits of at least one PDSCH received on BWPs having same code block group configuration;

wherein if the determined HARQ-ACK codebook only comprises HARQ-ACK bits of at least one PDSCH received on a same BWP, the determining the HARQ-ACK codebook comprises:
  in a case that an active BWP is switched by the user equipment, the determined HARQ-ACK codebook only comprises HARQ-ACK corresponding to at least one PDSCH received on a currently activated BWP, or,
  in a case that an active BWP is switched by the user equipment, the determined HARQ-ACK codebook only comprises HARQ-ACK corresponding to at least one PDSCH received on the BWP before the switch.

2. The method for determining the HARQ-ACK codebook according to claim 1, wherein the determining the HARQ-ACK codebook based on the code block group configuration of the BWP where the at least one PDSCH corresponding to the HARQ-ACK codebook is located comprises:
  determining the HARQ-ACK codebook based on code block group configuration of a BWP where each PDSCH corresponding to the HARQ-ACK codebook is located; or,
  determining the HARQ-ACK codebook based on code block group configuration of a BWP that has a maximum number of configured code block groups and is from a BWP set formed by at least one BWP where the at least one PDSCH corresponding to the HARQ-ACK codebook is located; or,
  determining the HARQ-ACK codebook based on code block group configuration of a BWP where a last PDSCH corresponding to the HARQ-ACK codebook is located.

3. The method for determining the HARQ-ACK codebook according to claim 2, wherein:
  the determining the HARQ-ACK codebook based on the code block group configuration of the BWP where each PDSCH corresponding to the HARQ-ACK codebook is located comprises: determining HARQ-ACK bits of each PDSCH corresponding to the HARQ-ACK codebook based on the number of code block groups in the code block group configuration of the BWP where each PDSCH corresponding to the HARQ-ACK codebook is located, and determining the HARQ-ACK codebook based on the HARQ-ACK bits of each PDSCH corresponding to the HARQ-ACK codebook;
  the determining the HARQ-ACK codebook based on the BWP that has the maximum number of configured code block groups and is from the BWP set formed by the at least one BWP where the at least one PDSCH corresponding to the HARQ-ACK codebook is located comprises: selecting the BWP that has the maximum number of configured code block groups, from the BWP set formed by the at least one BWP where the at least one PDSCH corresponding to the HARQ-ACK codebook is located, determining HARQ-ACK bits of each PDSCH corresponding to the HARQ-ACK codebook based on the number of code block groups in the code block group configuration of the selected BWP, and determining the HARQ-ACK codebook based on the HARQ-ACK bits of each PDSCH corresponding to the HARQ-ACK codebook; and
  the determining the HARQ-ACK codebook based on the code block group configuration of the BWP where the last PDSCH corresponding to the HARQ-ACK codebook is located comprises: obtaining the number of code block groups in the code block group configuration of the BWP where the last PDSCH corresponding to the HARQ-ACK codebook is located, determining HARQ-ACK bits of each PDSCH corresponding to the HARQ-ACK codebook, and determining the HARQ-ACK codebook based on the HARQ-ACK bits of each PDSCH corresponding to the HARQ-ACK codebook.

4. The method for determining the HARQ-ACK codebook according to claim 3, wherein the determining the HARQ-ACK bits of each PDSCH corresponding to the HARQ-ACK codebook based on the number of code block groups in the code block group configuration of the BWP where each PDSCH corresponding to the HARQ-ACK codebook is located comprises:
  in a case that the user equipment receives, on a first BWP, downlink control information (DCI) for instructing the user equipment to switch to a second BWP, and receives a PDSCH on the second BWP, the number of HARQ-ACK bits of the PDSCH received on the second BWP is determined as $N_2 \times N_{TB}$, where $N_2$ is the number of code block groups in code block group configuration of the second BWP, and $N_{TB}$ is the number of transport blocks, wherein code block group transmission is not configured for the first BWP and code block group transmission is configured for the second BWP;
  in a case that the user equipment receives, on a first BWP, DCI for instructing the user equipment to switch to a second BWP, and receives a PDSCH on the second BWP, the number of HARQ-ACK bits of the PDSCH received on the second BWP is determined as $N_{TB}$, where $N_{TB}$ is the number of transport blocks, wherein code block group transmission is configured for the first BWP and code block group transmission is not configured for the second BWP; and
  in a case that the user equipment receives, on a first BWP, DCI for instructing the user equipment to switch to a second BWP, and receives a PDSCH on the second BWP, the number of HARQ-ACK bits of the PDSCH received on the second BWP is determined as $N_2 \times N_{TB}$, where $N_2$ is the number of code block groups in code block group configuration of the second BWP, and $N_{TB}$ is the number of transport blocks, wherein code block group transmission is configured for the first BWP and code block group transmission is configured for the second BWP.

5. The method for determining the HARQ-ACK codebook according to claim 1, wherein the determining the HARQ-ACK codebook based on the code block group configuration of the BWP where the PDCCH scheduling the at least one PDSCH corresponding to the HARQ-ACK codebook is located comprises:
  determining the HARQ-ACK codebook based on code block group configuration of a BWP where a PDCCH scheduling each PDSCH corresponding to the HARQ-ACK codebook is located; or,
  determining the HARQ-ACK codebook based on code block group configuration of a BWP that has a maximum number of configured code block groups and is from a BWP set formed by at least one BWP where at least one PDCCH scheduling the at least one PDSCH corresponding to the HARQ-ACK codebook is located; or,
  determining the HARQ-ACK codebook based on code block group configuration of a BWP where a PDCCH scheduling a last PDSCH corresponding to the HARQ-ACK codebook is located.

6. The method for determining the HARQ-ACK codebook according to claim 5, wherein:
the determining the HARQ-ACK codebook based on the code block group configuration of the BWP where the PDCCH scheduling each PDSCH corresponding to the HARQ-ACK codebook is located comprises: determining HARQ-ACK bits of each PDSCH corresponding to the HARQ-ACK codebook based on the number of code block groups in the code block group configuration of the BWP where the PDCCH scheduling each PDSCH corresponding to the HARQ-ACK codebook is located, and determining the HARQ-ACK codebook based on the HARQ-ACK bits of each PDSCH corresponding to the HARQ-ACK codebook;
the determining the HARQ-ACK codebook based on the code block group configuration of the BWP that has the maximum number of configured code block groups and is from the BWP set formed by the at least one BWP where the at least one PDCCH scheduling the at least one PDSCH corresponding to the HARQ-ACK codebook is located comprises: selecting the BWP with the maximum number of configured code block groups, from the BWP set formed by the at least one BWP where the at least one PDCCH scheduling the at least one PDSCH corresponding to the HARQ-ACK codebook is located, determining HARQ-ACK bits of each PDSCH corresponding to the HARQ-ACK codebook based on the number of code block groups in the code block group configuration of the selected BWP, and determining the HARQ-ACK codebook based on the HARQ-ACK bits of each PDSCH corresponding to the HARQ-ACK codebook; and
the determining the HARQ-ACK codebook based on the code block group configuration of the BWP where the PDCCH scheduling the last PDSCH corresponding to the HARQ-ACK codebook is located comprises: obtaining the number of code block groups in the code block group configuration of the BWP where the PDCCH scheduling the last PDSCH corresponding to the HARQ-ACK codebook is located, determining HARQ-ACK bits of each PDSCH corresponding to the HARQ-ACK codebook, and determining the HARQ-ACK codebook based on the HARQ-ACK bits of each PDSCH corresponding to the HARQ-ACK codebook.

7. The method for determining the HARQ-ACK codebook according to claim 6, wherein the determining the HARQ-ACK bits of each PDSCH corresponding to the HARQ-ACK codebook based on the number of code block groups in the code block group configuration of the BWP where the PDCCH scheduling each PDSCH corresponding to the HARQ-ACK codebook is located comprises:
in a case that the user equipment receives, on a first BWP, downlink control information (DCI) for instructing the user equipment to switch to a second BWP, and receives a PDSCH on the second BWP, the number of HARQ-ACK bits of the PDSCH received on the second BWP is determined as $N_1 \times N_{TB}$, where $N_1$ is the number of code block groups in code block group configuration of the first BWP, and $N_{TB}$ is the number of transport blocks, wherein code block group transmission is not configured for the first BWP and code block group transmission is configured for the second BWP;
in a case that the user equipment receives, on a first BWP, DCI for instructing the user equipment to switch to a second BWP, and receives a PDSCH on the second BWP, the number of HARQ-ACK bits of the PDSCH received on the second BWP is determined as $N_{TB}$, where $N_{TB}$ is the number of transport blocks, wherein code block group transmission is configured for the first BWP and code block group transmission is not configured for the second BWP; and
in a case that the user equipment receives, on a first BWP, DCI for instructing the user equipment to switch to a second BWP, and receives a PDSCH on the second BWP, the number of HARQ-ACK bits of the PDSCH received on the second BWP is determined as $N_1 \times N_{TB}$, where $N_1$ is the number of code block groups in code block group configuration of the first BWP, and $N_{TB}$ is the number of transport blocks, wherein code block group transmission is configured for the first BWP and code block group transmission is configured for the second BWP.

8. The method for determining the HARQ-ACK codebook according to claim 1, wherein the determined HARQ-ACK codebook only comprising the HARQ-ACK corresponding to the at least one PDSCH received on the currently activated BWP in a case that the active BWP is switched by the user equipment, comprises: in a case that the active BWP is switched by the user equipment and code block group configuration of the BWP before the switch and code block group configuration of the BWP after the switch are different, the determined HARQ-ACK codebook only comprises HARQ-ACK bits corresponding to the PDSCH received on the currently activated BWP.

9. The method for determining the HARQ-ACK codebook according to claim 1, wherein the determined HARQ-ACK codebook only comprising the HARQ-ACK corresponding to the at least one PDSCH received on the BWP before the switch in a case that the active BWP is switched by the user equipment, comprises: in a case that the active BWP is switched by the user equipment and code block group configuration of the BWP before the switch and code block group configuration of the BWP after the switch are different, the determined HARQ-ACK codebook only comprises HARQ-ACK corresponding to the at least one PDSCH received on the BWP before the switch.

10. The method for determining the HARQ-ACK codebook according to claim 1, wherein after the determining the HARQ-ACK codebook, the method further comprises: feeding back the HARQ-ACK codebook; and
wherein the method further comprises: ignoring an instruction before feeding back the HARQ-ACK codebook, in a case that the user equipment receives the instruction used to indicate switching an active BWP.

11. The method for determining the HARQ-ACK codebook according to claim 1, wherein the HARQ-ACK codebook is a semi-static HARQ-ACK codebook or a dynamic HARQ-ACK code.

12. A user equipment, comprising a processor, a memory, and a program stored on the memory and executable by the processor, wherein the program, when being executed by the processor, configures the processor to: determine an HARQ-ACK codebook based on code block group configuration of a bandwidth part (BWP) where at least one physical downlink shared channel (PDSCH) corresponding to the HARQ-ACK codebook is located; or, determine an HARQ-ACK codebook based on code block group configuration of a BWP where a physical downlink control channel (PDCCH) scheduling at least one PDSCH corresponding to the HARQ-ACK codebook is located;
wherein the determined HARQ-ACK codebook only comprises HARQ-ACK bits of at least one PDSCH received on a same BWP, or, comprises HARQ-ACK bits of at least one PDSCH received on BWPs having same code block group configuration;

wherein if the determined HARQ-ACK codebook only comprises HARQ-ACK bits of at least one PDSCH received on a same BWP, the determining the HARQ-ACK codebook comprises:

in a case that an active BWP is switched by the user equipment, the determined HARQ-ACK codebook only comprises HARQ-ACK corresponding to at least one PDSCH received on a currently activated BWP, or, in a case that an active BWP is switched by the user equipment, the determined HARQ-ACK codebook only comprises HARQ-ACK corresponding to at least one PDSCH received on the BWP before the switch.

13. The user equipment according to claim 12, wherein the processor is configured to:

determine the HARQ-ACK codebook based on code block group configuration of a BWP where each PDSCH corresponding to the HARQ-ACK codebook is located; or, determine the HARQ-ACK codebook based on code block group configuration of a BWP that has a maximum number of configured code block groups and is from a BWP set formed by at least one BWP where the at least one PDSCH corresponding to the HARQ-ACK codebook is located; or, determine the HARQ-ACK codebook based on code block group configuration of a BWP where a last PDSCH corresponding to the HARQ-ACK codebook is located.

14. The user equipment according to claim 12, wherein the processor is configured to:

determine the HARQ-ACK codebook based on code block group configuration of a BWP where a PDCCH scheduling each PDSCH corresponding to the HARQ-ACK codebook is located; or, determine the HARQ-ACK codebook based on code block group configuration of a BWP that has a maximum number of configured code block groups and is from a BWP set formed by at least one BWP where at least one PDCCH scheduling the at least one PDSCH corresponding to the HARQ-ACK codebook is located; or, determine the HARQ-ACK codebook based on code block group configuration of a BWP where a PDCCH scheduling a last PDSCH corresponding to the HARQ-ACK codebook is located.

15. The user equipment according to claim 12, wherein the determined HARQ-ACK codebook only comprising the HARQ-ACK corresponding to the at least one PDSCH received on the currently activated BWP in a case that the active BWP is switched by the user equipment, comprises:
in a case that the active BWP is switched by the user equipment and code block group configuration of the BWP before the switch and code block group configuration of the BWP after the switch are different, the determined HARQ-ACK codebook only comprises HARQ-ACK bits corresponding to the PDSCH received on the currently activated BWP.

16. The user equipment according to claim 12, wherein the determined HARQ-ACK codebook only comprising the HARQ-ACK corresponding to the at least one PDSCH received on the BWP before the switch in a case that the active BWP is switched by the user equipment, comprises:
in a case that the active BWP is switched by the user equipment and code block group configuration of the BWP before the switch and code block group configuration of the BWP after the switch are different, the determined HARQ-ACK codebook only comprises HARQ-ACK corresponding to the at least one PDSCH received on the BWP before the switch.

17. The user equipment according to claim 12, wherein the processor is configured to: after determining the HARQ-ACK codebook, feed back the HARQ-ACK codebook; and wherein the processor is configured to: ignore an instruction before feeding back the HARQ-ACK codebook, in a case that the user equipment receives the instruction used to indicate switching an active BWP.

18. The user equipment according to claim 12, wherein the HARQ-ACK codebook is a semi-static HARQ-ACK codebook or a dynamic HARQ-ACK code.

19. A non-transitory computer readable storage medium, having a program stored thereon, wherein the program, when being executed by a processor, performs the following steps:

determining an HARQ-ACK codebook based on code block group configuration of a bandwidth part (BWP) where at least one physical downlink shared channel (PDSCH) corresponding to the HARQ-ACK codebook is located; or, determining an HARQ-ACK codebook based on code block group configuration of a BWP where a physical downlink control channel (PDCCH) scheduling at least one PDSCH corresponding to the HARQ-ACK codebook is located;

wherein the determined HARQ-ACK codebook only comprises HARQ-ACK bits of at least one PDSCH received on a same BWP, or, comprises HARQ-ACK bits of at least one PDSCH received on BWPs having same code block group configuration;

wherein if the determined HARQ-ACK codebook only comprises HARQ-ACK bits of at least one PDSCH received on a same BWP, the determining the HARQ-ACK codebook comprises:

in a case that an active BWP is switched by a user equipment, the determined HARQ-ACK codebook only comprises HARQ-ACK corresponding to at least one PDSCH received on a currently activated BWP, or, in a case that an active BWP is switched by a user equipment, the determined HARQ-ACK codebook only comprises HARQ-ACK corresponding to at least one PDSCH received on the BWP before the switch.

20. The non-transitory computer readable storage medium according to claim 19, wherein the determined HARQ-ACK codebook only comprising the HARQ-ACK corresponding to the at least one PDSCH received on the currently activated BWP in a case that the active BWP is switched by the user equipment, comprises: in a case that the active BWP is switched by the user equipment and code block group configuration of the BWP before the switch and code block group configuration of the BWP after the switch are different, the determined HARQ-ACK codebook only comprises HARQ-ACK bits corresponding to the PDSCH received on the currently activated BWP.

* * * * *